(12) United States Patent
Wang et al.

(10) Patent No.: US 12,503,667 B2
(45) Date of Patent: Dec. 23, 2025

(54) METHOD FOR REDUCING MINERAL OIL CONTENT IN EDIBLE VEGETABLE OIL

(71) Applicant: SANMARK CORP., Liaoning (CN)

(72) Inventors: Miao Wang, Liaoning (CN); Yanjie Li, Liaoning (CN)

(73) Assignee: SANMARK CORP., Liaoning (CN)

( * ) Notice: Subject to any disclaimer, the term of this patent is extended or adjusted under 35 U.S.C. 154(b) by 672 days.

(21) Appl. No.: 17/760,272

(22) PCT Filed: Nov. 30, 2021

(86) PCT No.: PCT/CN2021/134540
§ 371 (c)(1),
(2) Date: Aug. 5, 2022

(87) PCT Pub. No.: WO2022/242102
PCT Pub. Date: Nov. 24, 2022

(65) Prior Publication Data
US 2023/0295533 A1    Sep. 21, 2023

(30) Foreign Application Priority Data

May 17, 2021  (CN) .......................... 202110536049.9

(51) Int. Cl.
| | | |
|---|---|---|
| *C11B 3/12* | (2006.01) | |
| *A23D 9/007* | (2006.01) | |
| *A23D 9/04* | (2006.01) | |
| *B01D 1/22* | (2006.01) | |
| *B01D 3/12* | (2006.01) | |
| *B01D 61/14* | (2006.01) | |
| *C11B 3/00* | (2006.01) | |
| *C11B 7/00* | (2006.01) | |

(52) U.S. Cl.
CPC ................ *C11B 3/12* (2013.01); *A23D 9/007* (2013.01); *A23D 9/04* (2013.01); *B01D 1/225* (2013.01); *B01D 3/12* (2013.01); *B01D 61/145* (2013.01); *C11B 3/008* (2013.01); *C11B 7/0008* (2013.01)

(58) Field of Classification Search
CPC ......... C11B 3/008; C11B 7/0008; C11B 3/12; A23D 9/007; A23D 9/04; B01D 1/225; B01D 3/12; B01D 61/145
See application file for complete search history.

(56) References Cited

FOREIGN PATENT DOCUMENTS

| | | |
|---|---|---|
| CN | 108676613 A | 10/2018 |
| CN | 110938490 A | 3/2020 |
| CN | 111269209 A | 6/2020 |
| CN | 111373022 A | 7/2020 |
| CN | 111500357 A | 8/2020 |
| CN | 112029581 A | 12/2020 |
| CN | 113337338 A | 9/2021 |

OTHER PUBLICATIONS

Razali et al., "Recovery of mineral oil from waste emulsion using electrocoagulation method". MATEC Web of Conferences 38, 03005 (2016) (Year: 2016).*
An et al., "Emerging usage of electrocoagulation technology for oil removal from wastewater—A review". Science of the Total Environment 579 (2017) 537-556. (Year: 2017).*

* cited by examiner

*Primary Examiner* — Erik Kashnikow
*Assistant Examiner* — Assaf Zilbering
(74) *Attorney, Agent, or Firm* — NKL Law; Allen Xue

(57) ABSTRACT

A method for reducing mineral oil content in edible vegetable oil includes the following steps: carrying out the molecular distillation on the edible vegetable oil having mineral oil exceedance; mixing water, the vegetable oil and an emulsifier with stirring to form an unstable emulsion; standing the emulsion for 1 to 5 hours for layer separation to form oil phase and emulsified phase, or oil phase, emulsified phase and water phase, and then separating different phases; freezing the oil phase after stirring, and then treating the oil phase with high-voltage pulsed electric field followed by ultrafiltration to obtain a vegetable oil I; subjecting the emulsion phase to low-temperature plasma treatment and then to high-voltage pulsed electric field treatment to break emulsion, drawing the upper oil phase for ultrafiltration followed by molecular distillation to obtain a vegetable oil II.

12 Claims, No Drawings

US 12,503,667 B2

METHOD FOR REDUCING MINERAL OIL CONTENT IN EDIBLE VEGETABLE OIL

FIELD OF THE INVENTION

The present disclosure relates to a method for reducing mineral oil content in edible vegetable oil, belonging to the technical field of vegetable oil processing.

BACKGROUND

Mineral oil is produced in such processes as the physical separation and chemical conversion of crude oil and the liquefaction of coal, natural gas or biomass. The industrial products we daily contact, such as liquid paraffin, lubricating oil, hydraulic oil and engine oil, belong to mineral oil products. Mineral oil hydrocarbon (MOH) is composed of a large number of different chemical components. Mineral oil mainly includes MOSH (mineral oil saturated hydrocarbon) and MOAH (mineral oil aromatic hydrocarbon). Mineral oil saturated hydrocarbon is mainly composed of chain alkanes (straight and branched chain alkanes) and cycloalkanes (mainly cyclopentane and cyclohexane, alkylation and non-alkylation, and monocyclic, bicyclic and higher cyclic cycloalkanes). Mineral oil aromatic hydrocarbons include alkyl substituted aromatic hydrocarbons (mainly including monocyclic, bicyclic and higher cyclic aromatic hydrocarbons).

In recent years, food security problems caused by mineral oil pollution have occurred from time to time, such as the Ukrainian sunflower seed oil polluted by mineral oil from unknown sources, which has drawn attention widely. A study on the harm of mineral oil shows that mineral oil cannot be absorbed or digested by the human intestine, and hinders the absorption of water. Long term mineral oil intake can induce digestive tract disorders and affect the absorption of fat-soluble vitamins A, D, K and calcium and phosphorus, which is extremely harmful to human body. The evaluation report of the European Food Safety Agency (EFSA) in 2012 shows that the MOSH substances with medium and low viscosity can accumulate in animal body and produce micro granulomas in organs including liver, spleen and lymph nodes. At present, the European Union pays much attention to the mineral oil content in China's export products, and the required indexes are relatively strict.

Mineral oil pollution in edible vegetable oil mainly comes from the following three aspects: (1) during the harvesting, drying, transportation and processing, the oil plants comes into contact with the engine oil and lubricating oil, resulting in the production of saturated hydrocarbon mineral oil during its metabolism; (2) the leakage of heat conduction oil (liquid paraffin) in the oil refining process; (3) environmental migration during storage and lubricant migration from plastic packaging materials, etc. At present, there is no clear method for effectively reducing the mineral oil saturated hydrocarbon in vegetable oil in China. Domestic research mainly focuses on the qualitative or quantitative analysis of mineral oil in vegetable oil. Patent application CN 111269209A provided a method for removing the mineral oil from VE, which uses chromatographic column for separation and then elutes with organic solvent. Although this method has a certain effect on the removal of mineral oil, it consumes a large amount of organic solvent. The organic solvent ethyl acetate has high toxicity and is prone to safety risks, and the method requires frequent replacement of chromatographic column. In addition, the object of this method is vitamin E, and it is unknown whether it is effective against vegetable oil.

SUMMARY OF THE INVENTION

Based on the above problems and shortages in the prior art, the present disclosure provides a method for reducing the mineral oil in the vegetable oil.

The technical method in the present disclosure is as follows:

A method for reducing mineral oil content in edible vegetable oil, including following steps of:
  S1. molecular distillation: carrying out molecular distillation on the edible vegetable oil having mineral oil exceedance so as to remove the mineral oil saturated hydrocarbon having a lower molecular weight; wherein in the vegetable oil having mineral oil exceedance, MOSH >10 ppm and MOAH <2 ppm.
  S2. emulsification: mixing water, the vegetable oil and an emulsifier with stirring to form an unstable O/W emulsion.
  S3. standing the emulsion for layer separation to form oil phase and emulsified phase, or oil phase, emulsified phase and water phase, separating the different phases and retaining the oil phase and emulsified phase for further treatment.
  S4. freezing the oil phase after stirring at a certain temperature, and then treating the oil phase with a high-voltage pulsed electric field, followed by ultrafiltering the oil phase to obtain a vegetable oil I.
  S5. subjecting the emulsified phase to low-temperature plasma treatment and high-voltage pulsed electric field treatment to breaking emulsion, drawing the upper oil phase for ultrafiltration, followed by molecular distillation to obtain a vegetable oil II. The obtained vegetable oil I and vegetable oil II are both edible vegetable oil that reduces the mineral oil content.

The mineral oil is mineral oil saturated hydrocarbon and/or mineral oil aromatic hydrocarbon.

Further, in the above technical solution, in step S1, the edible vegetable oil includes, but is not limited to, $perilla$ oil, evening primrose oil, borage oil, flaxseed oil, pumpkinseed oil, blackcurrant oil, hemp seed oil, grapeseed oil, wheat germ oil, avocado oil, safflower oil, olive oil, high oleic acid sunflower seed oil, sunflower seed oil, pecan oil, walnut oil, soybean oil and sesame oil.

Further, in the above technical solution, in step S1, an evaporation pressure of the molecular distillation is 2 to 5 kPa, a distillation temperature is 115 to 155° C., a feeding speed is 25 to 40 drops/min, and a wiped film rotational speed is 150 to 180 rpm/min.

Further, in the above technical solution, in step S2, the water, vegetable oil and emulsifier are stirred at 40 to 70° C. for 25 to 75 minutes.

Further, in the above technical solution, in step S2, a volume ratio of the vegetable oil to the water is 1:2 to 5, a content of the emulsifier is 0.5 to 3.5 wt. % of a system composed of the water, vegetable oil and emulsifier. The emulsifier includes one of non-ionic surfactants with HLB of 10 of 15, or a compound emulsifier with HLB of 10 to 15 formed by mixing several emulsifiers with different HLB in a certain proportion.

Further, in the above technical solution, in step S3, a standing time is 1 to 5 hours.

Further, in the above technical solution, in step S4, the oil phase is stirred at 40 to 80° C. for 0 to 50 minutes, and then is frozen at 0 to 4° C. for 0 to 2 hours, followed by treating the oil phase with the high-voltage pulsed electric field. The conditions of the high-voltage pulsed electric field treatment are as follows: an intensity of the high-voltage pulsed electric field of 40 to 80 kV/cm, a pulse width of 5 to 20 μs, and a number of pulses of 50 to 150.

Further, in the above technical solution, in step S5, the conditions of the low-temperature plasma treatments are as follows: pulse discharge, a pulse voltage peak of 30 to 80 kV, a discharge frequency of 50 to 100 HZ and a treatment time of 5 to 30 minutes, and the treatment is repeated for 2 to 5 times. Further, in the above technical solution, in step S5, the conditions of the high-voltage pulsed electric field treatment are as follows: an intensity of the high-voltage pulsed electric field of 30 to 80 kV/cm, a pulse width of 5 to 20 μs, and a number of pulses of 50 to 150.

Further, in the above technical solution, in step S5, the conditions of the molecular distillation are as follows: an evaporation pressure of 2 to 6 kPa, a distillation temperature of 120 to 160° C., a feeding speed of 20 to 40 drops/min, and a wiped film rotational speed of 150 to 190 rpm/min.

Due to the HLB difference between the mineral oil and the vegetable oil, by screening the HLB value the present disclosure selects emulsifiers that are applicable for mineral oil (such as paraffin and lubricating oil, with HLB value ranging from 10 to 15) while less applicable for vegetable oil (with HLB value ranging from 6 to 8), and controls the content of the emulsifiers so as to form an extremely unstable emulsion, followed by standing for layer separation to form two layers of upper oil phase and lower emulsified phase, or three layers of upper oil phase, middle emulsified phase and lower water phase. As the emulsifiers are applicable for mineral oil, the mineral oil will be separated from vegetable oil and exist in the emulsified phase, so as to achieve the purpose of removing the mineral oil, and the total amount of the mineral oil saturated hydrocarbon in the separated oil phase will be reduced to less than 10 ppm.

Although, purposeful emulsification based on the HLB value can reduce the content of mineral oil, there is still a small amount of vegetable oil (about 10 to 25%) in the emulsified phase, resulting in loss. Therefore, in the step S5, low-temperature plasma is used to treat the emulsified phase, which can effectively degrade the mineral oil saturated hydrocarbon in the emulsified phase, and then recover the vegetable oil in the emulsified phase. However, low-temperature plasma treatment may cause oxidative degradation on the vegetable oil at the same time, so that the conditions of low-temperature plasma treatment should be strictly controlled. After low-temperature plasma treatment the emulsified phase is broken, the content of mineral oil saturated hydrocarbon in the vegetable oil is reduced to the following standards of MOAH ≤2 ppm and MOSH ≤10 ppm (set with reference to the draft German Mineral Oil Regulation).

In the step S5, the high-voltage pulsed electric field is used to treat the oil phase. The purpose of the high-voltage pulsed electric field treatment, on the one hand, is to further remove the water, residual emulsifier and some precipitation precursor in the vegetable oil, and on the other hand, is to break of emulsion to separate the vegetable oil from the emulsified phase.

The purpose of molecular distillation in step S1 is to remove the mineral oil saturated hydrocarbon having a low molecular weight that may exist in the vegetable oil. The purpose of molecular distillation in step S5 is to remove small molecular organics produced in the process of the mineral oil saturated hydrocarbon degraded by low-temperature plasma treatment.

The total amount of the vegetable oil I obtained in step S4 and the vegetable oil II obtained in step S5 is 95 to 97% of the initial amount of the vegetable oil, and the loss is 3 to 5%.

The present disclosure can effectively reduce the content of mineral oil in vegetable oil while a loss of the vegetable oil is low. The present disclosure does not use any organic solvent and has good safety.

DETAILED DESCRIPTION OF THE INVENTION

The following non-limiting embodiments can enable those skilled in the art to understand the present disclosure more comprehensively, but do not limit the present disclosure in any way.

Embodiment 1

S1. *Perilla* oil having mineral oil exceedance was subjected to molecular distillation, and the source of pollution was liquid paraffin with HLB 10.2. The evaporation pressure was 4 kPa, the distillation temperature was 140° C., the feeding speed was 35 drops/min, and the wiped film rotational speed was 160 rpm/min.

S2. The *perilla* oil (HLB 7.4) obtained after treatment in step S1 was mixed with water and Tween 65 (HLB 10.5) with stirring at 50° C. for 50 min. An emulsion was obtained. The volume ratio of the *perilla* oil to the water was 1:3, and the content of Tween 65 was 1.5 wt. % of the whole system.

S3. The emulsion obtained in step S2 was stood for 2 hours for layer separation to form an oil phase and an emulsified phase. The two phases were separated and respectively retained for further treatment.

S4. The oil phase was stirred at 70° C. for 35 minutes, and then was frozen at 4° C. for 1 hour. The oil phase was then treated with high-voltage pulsed electric field. The intensity of the high-voltage pulsed electric filed was 60 kV/cm, the pulse width was 5 μs, and the number of pulses was 100. The oil phase was then subjected to ultrafiltration to obtain a *perilla* oil I.

S5. The emulsified phase was subjected to low-temperature plasma treatment, and then was treated with high-voltage pulsed electric field to break emulsion. The upper oil phase was drawn for molecular distillation to obtain a *perilla* seed oil II. The discharge mode of the low-temperature plasma was pulse discharge, the pulse voltage peak was 40 kV, the discharge frequency was 60 HZ, the treatment time was 20 minutes, and the treatment was repeated for twice. The conditions of the high-voltage pulsed electric field treatment were as follows: the intensity of high-voltage pulsed electric field of 50 kV/cm, the pulse width of 10 μs, and the number of pulses of 50. The conditions of the molecular distillation were as follows: the evaporation pressure of 4 kPa, the distillation temperature of 150° C., the feeding speed of 30 drops/min, and the wiped film rotational speed of 160 rpm/min.

TABLE 1-1

Comparison of mineral oil contents in perilla oil I, perilla oil II and initial perilla oil

| Mineral oil | Standard | Initial perilla oil | Perilla oil I | Perilla oil II |
|---|---|---|---|---|
| MOSH | ≤10 ppm | 91 ppm | 6 ppm | 9 ppm |
| MOAH | ≤2 ppm | 39 ppm | Not detected (<1 ppm) | 2 ppm |

TABLE 1-2

Comparison of contents of other pollutants in perilla oil I, perilla oil II and initial perilla oil

| Other pollutants | Standard | Initial perilla oil | Perilla oil I | Perilla oil II |
|---|---|---|---|---|
| Polycyclic aromatic hydrocarbon (PAH 4) | ≤10 ppb | Not detected (<0.5 ppb) | Not detected (<0.5 ppb) | 3.6 ppb |
| Trans-fatty acids | ≤2% | 0.19% | 0.21% | 0.71% |
| Glycidyl ester | ≤1000 ppb | Not detected (<100 ppb) | 105 ppb | 195 ppb |
| 3-MPCD | ≤2500 ppb | Not detected (<100 ppb) | Not detected (<100 ppb) | 280 ppb |

It can be seen from Table 1-1 that MOSH and MOAH in the *perilla* oil I and *perilla* oil II obtained after treatment are reduced below the set standard. It can be seen from Table 1-2 that, at the strict condition control of this process, other pollutants all meet the requirements of European Union regulations on relevant pollutant limits.

Embodiment 2

S1. High oleic acid sunflower seed oil having mineral oil exceedance was subjected to molecular distillation, and the source of pollution was lubricating oil A with HLB 13.4. The evaporation pressure was 4 kPa, the distillation temperature was 140° C., the feeding speed was 30 drops/min, and the wiped film rotational speed was 160 rpm/min.

S2. The high oleic acid sunflower seed oil (HLB 8.1) obtained after treatment in step S1 was mixed with water and AEO 9 (HLB 13.5) with stirring at 60° C. for 50 min. An emulsion was obtained. The volume ratio of the high oleic acid sunflower seed oil to the water was 1:4, and the content of AEO 9 was 1.2 wt. % of the whole system.

S3. The emulsion obtained in step S2 was stood for 2 hours for layer separation to form an oil phase, an emulsified phase and an water phase. The three phases were separated, and the oil phase and the emulsified phase were respectively retained for further treatment.

S4. The oil phase was treated with high-voltage pulsed electric field. The intensity of the high-voltage pulsed electric file was 40 kV/cm, the pulse width was 15 μs, and the number of pulses was 50. The oil phase was then subjected to ultrafiltration to obtain a high oleic acid sunflower seed oil I.

S5. The emulsified phase was subjected to low-temperature plasma treatment, and then was treated with high-voltage pulsed electric field to break emulsion. The upper oil phase was drawn for molecular distillation to obtain a high oleic acid sunflower seed oil II. The discharge mode of the low-temperature plasma was pulse discharge, the pulse voltage peak was 40 kV, the discharge frequency was 80 HZ, the treatment time was 15 minutes, and the treatment was repeated for three times. The conditions of the high-voltage pulsed electric field were as follows: the intensity of the high-voltage pulsed electric field of 30 kV/cm, the pulse width of 5 μs, and the number of pulses of 100. The conditions of the molecular distillation were as follows: the evaporation pressure of 4 kPa, the distillation temperature of 160° C., the feeding speed of 30 drops/min, and the wiped film rotational speed of 160 rpm/min.

TABLE 2-1

Comparison of mineral oil contents in high oleic acid sunflower seed oil I, high oleic acid sunflower seed oil II and initial high oleic acid sunflower seed oil

| Mineral oil | Standard | Initial high oleic acid sunflower seed oil | High oleic acid sunflower seed oil I | High oleic acid sunflower seed oil II |
|---|---|---|---|---|
| MOSH | ≤10 ppm | 108 ppm | 6 ppm | 10 ppm |
| MOAH | ≤2 pm | 97 ppm | Not detected (<1 ppm) | 1 ppm |

TABLE 2-2

Comparison of contents of other pollutants in high oleic acid sunflower seed oil I, high oleic acid sunflower seed oil II and initial high oleic acid sunflower seed oil

| Other pollutants | Standard | Initial high oleic acid sunflower seed oil | High oleic acid sunflower seed oil I | High oleic acid sunflower seed oil II |
|---|---|---|---|---|
| Polycyclic aromatic hydrocarbon (PAH 4) | ≤10 ppb | Not detected (<0.5 ppb) | Not detected (<0.5 ppb) | 2.8 ppb |
| Trans fatty acids | ≤2% | 0.12% | 0.16% | 0.37% |
| Glycidyl ester | ≤1000 ppb | Not detected (<100 ppb) | Not detected (<100 ppb) | 180 ppb |
| 3-MPCD | ≤2500 ppb | Not detected (<100 ppb) | Not detected (<100 ppb) | 260 ppb |

It can be seen from Table 2-1 that MOSH and MOAH of in the high oleic acid sunflower seed oil I and high oleic acid sunflower seed oil II obtained after treatment are reduced below the standard. It can be seen from Table 2-2 that, at the strict condition control of this process, the contents of other pollutants all meet the requirements of European Union regulations on relevant pollutant limits.

Embodiment 3

S1. The grapeseed oil having mineral oil exceedance was subjected to molecular distillation, and the source of pollution was lubricating oil B with HLB 14.0. The evaporation pressure was 5 kPa, the distillation temperature was 140° C., the feeding speed was 40 drops/min, and the wiped film rotational speed was 150 rpm/min.

S2. The grape seed oil (HLB 7.3) obtained after treatment in step S1 was mixed with water and a compound emulsifier (HLB 14.0) with stirring at 60° C. for 50 minutes. The volume ratio of the grapeseed oil to the water was 1:3, and the content of the compound emulsifier was 2.5 wt. % of the whole system. The compound emulsifier was a mixture of Tween 80 and Span 60 at a ratio of 9:1.

S3. The emulsion obtained in step S2 was stood for 2 hours for layer separation to form an oil phase and an emulsified phase. The two phases were separated and respectively retained for further treatment.

S4. The oil phase was treated with high-voltage pulsed electric field. The intensity of the high-voltage pulsed electric file was 60 kV/cm, the pulse width was 10 μs, and the number of pulses was 60. The oil phase was then subjected to ultrafiltration to obtain a grapeseed oil I.

S5. The emulsified phase was subjected to low-temperature plasma treatment, and then was treated with high-voltage pulsed electric field to break emulsion. The upper oil phase was drawn for molecular distillation to obtain a grapeseed oil II. The discharge mode of the low-temperature plasma was pulse discharge, the pulse voltage peak was 50 kV, the discharge frequency was 70 HZ, the treatment time was 15 minutes, and the treatment was repeated for twice. The conditions of the high-voltage pulsed electric field treatment were as follows: the intensity of the high-voltage pulsed electric field of 40 kV/cm, the pulse width of 15 μs, and the number of pulses of 80. The conditions of the molecular distillation were as follows: the evaporation pressure of 4 kPa, the distillation temperature of 155° C., the feeding speed of 40 drops/min, and the wiped film rotational speed of 160 rpm/min.

TABLE 3-1

Comparison of mineral oil contents in grapeseed oil I, grapeseed oil II and initial grapeseed oil

| Mineral oil | Standard | Initial grape seed oil | Grapeseed oil I | Grapeseed oil II |
|---|---|---|---|---|
| MOSH | ≤10 ppm | 96 ppm | 4 ppm | 8 ppm |
| MOAH | ≤2 pm | 123 ppm | Not detected (<1 ppm) | 2 ppm |

TABLE 3-2

Comparison of contents of other pollutants in grapeseed oil I, grapeseed oil II and initial grapeseed oil

| Other pollutants | Standard | Initial grapeseed oil | Grapeseed oil I | Grapeseed oil II |
|---|---|---|---|---|
| Polycyclic aromatic hydrocarbon (PAH 4) | ≤10 ppb | Not detected (<0.5 ppb) | Not detected (<0.5 ppb) | 2.9 ppb |
| Trans-fatty acids | ≤2% | 0.13% | 0.17% | 0.28% |
| Glycidyl ester | ≤1000 ppb | Not detected (<100 ppb) | Not detected (<100 ppb) | 175 ppb |
| 3-MPCD | ≤2500 ppb | Not detected (<100 ppb) | 140 ppb | 270 ppb |

It can be seen from Table 3-1 that MOSH and MOAH in the grapeseed oil I and grapeseed oil II obtained after treatment are reduced below the standard. It can be seen from Table 3-2 that, at the strict condition control of this process, other pollutants all meet the requirements of European Union regulations on relevant pollutant limits.

Embodiment 4

S1. Evening primrose oil having mineral oil exceedance was subjected to molecular distillation, and the source of pollution was white oil with HLB 10.5. The evaporation pressure was 3 kPa, the distillation temperature was 140° C., the feeding speed was 35 drops/min, and the wiped film rotational speed was 160 rpm/min.

S2. The evening primrose oil (HLB 7.1) obtained after treatment in step S1 was mixed with water and a compound emulsifier (HLB 10.6) with stirring at 55° C. for 45 minutes. An emulsion was obtained. The volume ratio of the evening primrose oil to the water was 1:3, and the content of the compound emulsifier was 1.8 wt. % of the whole system. The compound emulsifier was a mixture of Atlas G2127 and Tegin at a ratio of 7:3.

S3. The emulsion was stood for 2 hours for layer separation to form an oil phase and an emulsion phase. The two phases were separated and respectively retained for further treatment.

S4. The oil phase was stirred at 55° C. for 30 minutes, and then was frozen at 0° C. for 0.5 hour. The oil phase was then treated with high-voltage pulsed electric field. The intensity of the high-voltage pulsed electric file was 50 kV/cm, the pulse width was 10 μs, and the number of pulses was 50. The oil phase was then subjected to ultrafiltration to obtain an evening primrose oil I.

S5. The emulsified phase liquid was subjected to low-temperature plasma treatment, and then was treated with high-voltage pulsed electric field to break emulsion. The upper oil phase was drawn for molecular distillation to obtain an evening primrose oil II. The discharge mode of the low-temperature plasma was pulse discharge, the pulse voltage peak was 40 kV, the discharge frequency was 60 HZ, the treatment time was 20 minutes, and the treatment was repeated for twice. The conditions of the high-voltage pulsed electric field treatment were as follows: the intensity of the high-voltage pulsed electric field of 60 kV/cm, the pulse width of 10 μs, and the number of pulses of 60. The conditions of the molecular distillation were as follows: the evaporation pressure of 4 kPa, the distillation temperature of 150° C., the feeding speed of 30 drops/min, and the wiped film rotational speed of 160 rpm/min.

TABLE 4-1

Comparison of mineral oil contents in evening primrose oil I, evening primrose oil II and initial evening primrose oil

| Mineral oil | Standard | Initial evening primrose oil | Evening primrose oil I | Evening primrose oil II |
|---|---|---|---|---|
| MOSH | ≤10 ppm | 177 ppm | 6 ppm | 9 ppm |
| MOAH | ≤2 pm | 153 ppm | 1 ppm | 1 ppm |

TABLE 4-2

Comparison of contents of other pollutants in evening primrose oil I, evening primrose oil II and initial evening primrose oil

| Other pollutants | Standard | Initial evening primrose oil | Evening primrose oil I | Evening primrose oil II |
|---|---|---|---|---|
| Polycyclic aromatic hydrocarbon (PAH 4) | ≤10 ppb | Not detected (<0.5 ppb) | Not detected (<0.5 ppb) | 3.8 ppb |
| Trans-fatty acids | ≤2% | 0.12% | 0.18% | 0.49% |
| Glycidyl ester | ≤1000 ppb | Not detected (<100 ppb) | 125 ppb | 190 ppb |
| 3-MPCD | ≤2500 ppb | Not detected (<100 ppb) | 150 ppb | 275 ppb |

It can be seen from Table 4-1 that MOSH and MOAH in the evening primrose oil I and evening primrose oil II obtained after treatment are reduced below the set standard. It can be seen from Table 4-2 that, at the strict condition control of this process, the contents of other pollutants all meet the requirements of European Union regulations on relevant pollutant limits.

The invention claimed is:

1. A method for reducing mineral oil content in edible vegetable oil, comprising the following steps of:
S1. carrying out molecular distillation on a vegetable oil having mineral oil exceedance;
S2. mixing water, the vegetable oil and an emulsifier with stirring to form an emulsion;
S3. standing the emulsion for layer separation to form an oil phase, an emulsified phase, and an optional water phase, and then separating the oil phase and the emulsified phase from the emulsion;
S4. freezing the oil phase at a certain temperature, and then treating the oil phase with a high-voltage pulsed electric field, followed by ultrafiltration to obtain a first vegetable oil; and
S5. subjecting the emulsified phase to a plasma treatment and then to high-voltage pulsed electric field treatment to break emulsion, drawing an upper oil phase for ultrafiltration, followed by molecular distillation to obtain a second vegetable oil, wherein the first vegetable oil and the second vegetable oil are edible; and;
wherein the mineral oil is a mineral oil saturated hydrocarbon, a mineral oil aromatic hydrocarbon, or a mixture thereof.

2. The method according to claim 1, wherein in step S1, the vegetable oil is selected from *perilla* oil, evening primrose oil, borage oil, flaxseed oil, pumpkinseed oil, blackcurrant oil, hemp seed oil, grapeseed oil, wheat germ oil, avocado oil, safflower oil, olive oil, high oleic acid sunflower seed oil, sunflower seed oil, pecan oil, walnut oil, soybean oil, and sesame oil.

3. The method according to claim 1, wherein in step S1, the molecular distillation is carried out under an evaporation pressure of 2 to 5 KPa, at a distillation temperature of 115 to 155° C., a feeding speed of the vegetable oil of 25 to 40 drops/min, and a wiped film rotational speed of 150 to 180 rpm/min.

4. The method according to claim 1, wherein in step S2, the water, vegetable oil and emulsifier are stirred at 40 to 70° C. for 25 to 75 minutes.

5. The method according to claim 1, wherein in step S2, a volume ratio of the vegetable oil to the water is 1:2 to 5, and a content of the emulsifier is 0.5 to 3.5 wt. % of the emulsion.

6. The method according to claim 1, wherein in step S2, the emulsifier having HLB of 10 to 15, that is a non-ionic surfactant or a mixture of multiple emulsifiers.

7. The method according to claim 1, wherein in step S3, a standing time is 1 to 5 hours.

8. The method according to claim 1, wherein in step S4, the oil phase is stirred at 40 to 80° C. for 0 to 50 minutes, and then is frozen at 0 to 4° C. for 0 to 2 hours, followed by treating the oil phase with the high-voltage pulsed electric field.

9. The method according to claim 8, wherein in step S4, the high-voltage pulsed electric field treatment has an intensity of the high-voltage pulsed electric field of 40 to 80 kV/cm, a pulse width of 5 to 20 μs, and a number of pulses of 50 to 150.

10. The method according to claim 1, wherein in step S5, the plasma treatment discharges pulses having a pulse voltage peak of 30 to 80 kV, at a discharge frequency of 50 to 100 HZ and a treatment time of 5 to 30 minutes, and the treatment is carried out for 2 to 5 times.

11. The method according to claim 1, wherein in step S5, the high-voltage pulsed electric field treatment has an intensity of the high-voltage pulsed electric field of 30 to 80 kV/cm, a pulse width of 5 to 20 μs, and a number of pulses of 50 to 150.

12. The method according to claim 1, wherein in step S5, the molecular distillation is carried out under an evaporation pressure of 2 to 6 kPa, a distillation temperature of 120 to 160° C., a feeding speed of oil from the upper oil phase of 20 to 40 drops/min, and a wiped film rotational speed of 150 to 190 rpm/min.

* * * * *